(12) United States Patent
Shibuya et al.

(10) Patent No.: US 10,794,247 B2
(45) Date of Patent: Oct. 6, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Daisuke Shibuya, Nisshin (JP); Ryoko Miyawaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/282,977

(22) Filed: Feb. 22, 2019

(65) Prior Publication Data
US 2019/0292956 A1 Sep. 26, 2019

(30) Foreign Application Priority Data
Mar. 26, 2018 (JP) .................. 2018-058651

(51) Int. Cl.
*F01N 3/023* (2006.01)
*F02D 41/02* (2006.01)
*F02D 41/14* (2006.01)
*F02D 41/00* (2006.01)
*F01N 3/021* (2006.01)

(52) U.S. Cl.
CPC ............. *F01N 3/023* (2013.01); *F01N 3/021* (2013.01); *F02D 41/0082* (2013.01); *F02D 41/025* (2013.01); *F02D 41/029* (2013.01); *F02D 41/1408* (2013.01); *F02D 41/1439* (2013.01); *F02D 41/1454* (2013.01); *F02D 41/1467* (2013.01); *F01N 2430/06* (2013.01); *F01N 2900/1606* (2013.01); *F02D 2200/0802* (2013.01); *F02D 2200/0812* (2013.01)

(58) Field of Classification Search
CPC ...... F01N 3/021; F01N 3/023; F01N 2430/06; F01N 2900/1606; F02D 41/0082; F02D 41/025; F02D 41/029; F02D 41/1408; F02D 41/1439; F02D 41/1454; F02D 41/1467; F02D 2200/0802; F02D 2200/0812
See application file for complete search history.

(56) References Cited

U.S. PATENT DOCUMENTS

2011/0073088 A1   3/2011   Hubbard et al.

FOREIGN PATENT DOCUMENTS

| DE | 10 2016 110 632 A1 | 12/2017 |
|---|---|---|
| EP | 2 511 491 A1 | 10/2012 |
| EP | 3 467 284 A1 | 4/2019 |
| JP | 2015-135096 A | 7/2015 |
| WO | 2015/107911 A1 | 7/2015 |

*Primary Examiner* — Brandon D Lee
(74) *Attorney, Agent, or Firm* — Oliff PLC

(57) ABSTRACT

A controller executes a dither control process and a deposition amount calculating process. In the dither control process, on condition that an execution request for a regeneration process of the filter is made, fuel injection valves are operated such that at least one of the cylinders is a lean combustion cylinder, and at least another one of the cylinders is a rich combustion cylinder. In the deposition amount calculating process, a deposition amount is calculated such that, as compared to a case in which a target value of an average value of an exhaust air-fuel ratio in a predetermined period by the dither control process is a first air-fuel ratio, a decrease amount per unit time of the deposition amount is calculated to be a great value in a case in which the target value is a second air-fuel ratio, which is leaner than the first air-fuel ratio.

8 Claims, 5 Drawing Sheets

CONTROLLER AND CONTROL METHOD FOR INTERNAL COMBUSTION ENGINE

BACKGROUND ART

The present disclosure relates to a controller and control method configured to control an internal combustion engine that includes a filter configured to trap particulate matter in exhaust gas discharged from cylinders and fuel injection valves provided for the respective cylinders.

For example, Japanese Laid-Open Patent Publication No. 2015-135096 discloses a controller that calculates the amount of particulate matter trapped by a filter that traps particulate matter in exhaust gas based on the rotation speed and the load of an internal combustion engine equipped with the filter. When the deposition amount, which is the calculated amount of particulate matter, is greater than or equal to a predetermined amount, the controller executes a regeneration process to remove the particulate matter by burning.

The above-described publication does not disclose successive calculation of the decrease amount of the deposition amount through the regeneration process. If the decrease amount of the deposition amount through the regeneration process is not calculated successively, the execution time of the regeneration process may become unnecessarily long or excessively short.

SUMMARY

Example 1: In accordance with one aspect of the present disclosure, a controller for an internal combustion engine is provided. The controller is configured to control an internal combustion engine that is mounted on a vehicle and includes a filter configured to trap particulate matter in exhaust gas discharged from a plurality of cylinders and fuel injection valves provided for the respective cylinders. The controller being configured to execute: on condition that an execution request for a regeneration process of the filter is made, a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and a deposition amount calculating process of calculating a deposition amount, which is an amount of particulate matter trapped by the filter, such that, as compared to a case in which a target value of an average value of an exhaust air-fuel ratio in a predetermined period by the dither control process is a first air-fuel ratio, a decrease amount per unit time of the deposition amount is calculated to be a great value in a case in which the target value is a second air-fuel ratio, which is leaner than the first air-fuel ratio.

Since the above-described dither control process can raise the temperature of the filter by using the heat of reaction between unburned fuel in the exhaust gas and oxygen, the particulate matter trapped by the filter can be removed by burning. In the above configuration, the decrease amount per unit time due to the burning of particulate matter is successively calculated in accordance with the air-fuel ratio, to calculate the deposition amount of the particulate matter. Therefore, it is possible to calculate the deposition amount while capturing how much oxygen that oxidizes the particulate matter will flow into the high temperature filter based on the air-fuel ratio and accurately calculate the deposition amount during the regeneration process.

Example 2: The controller for an internal combustion engine of Example 1 is configured to execute a second mode, in which the controller executes the dither control process with the target value set to the second air-fuel ratio, after a first mode, in which the controller executes the dither control process with the target value set to the first air-fuel ratio.

In the above-described configuration, since the target value of the first mode is richer than that of the second mode, it is easy to raise the exhaust temperature, so that the temperature of the filter is raised at an early stage to a temperature at which the regeneration process can be executed. In addition, the target value of the second mode is leaner than that of the first mode. Thus, in the second mode, the amount of oxygen supplied to the filter can be increased in comparison with the first mode. This promotes the regeneration process.

Example 3: In the controller for an internal combustion engine of Example 2, the first air-fuel ratio is a stoichiometric air-fuel ratio. The deposition amount calculating process includes a process in which a temperature of the filter is used as an input, and, when the temperature is higher than or equal to a prescribed temperature, the decrease amount is calculated to be a value greater than zero in a case in which the target value is the second air-fuel ratio, and to be zero in a case in which the target value is the first air-fuel ratio.

When the target value is the stoichiometric air-fuel ratio, the amount of oxygen flowing into the filter becomes negligibly small, so that the particulate matter is thought to remain unburned. Therefore, in the above-described configuration, the decrease amount is set to zero in the case of the stoichiometric air-fuel ratio even at the temperature at which the particulate matter is burned when the air-fuel ratio is leaner than the stoichiometric air-fuel ratio.

Example 4: In the controller for an internal combustion engine of Example 3, a catalyst having an oxygen storage capacity is provided in a section of an exhaust passage of the internal combustion engine that is upstream of the filter.

In the above configuration, the temperature of the exhaust gas rises due to the heat of reaction when oxygen discharged from the lean combustion cylinder reacts with the unburned fuel discharged from the rich combustion cylinder in the catalyst, and this exhaust gas flows into the filter. This supplies more heat to the filter than in a case in which the dither control process is not executed. In this case, however, if the target value is the stoichiometric air-fuel ratio, no oxygen is thought to be supplied to the filter. Thus, it is effective to set the decrease amount to zero as in Example 3 above.

Example 5: In the controller for an internal combustion engine of Example 1, the first air-fuel ratio is leaner than the stoichiometric air-fuel ratio.

In the region where the target value is leaner than the stoichiometric air-fuel ratio, the amount of oxygen supplied to the filter becomes greater when the target value is lean than when the target value is close to the stoichiometric air-fuel ratio. Thus, the combustion amount per unit time of particulate matter increases. In contrast, in the above-described configuration, the deposition amount can be calculated with high accuracy by calculating the decrease amount to be a great value in the deposition amount calculating process.

Example 6: In the controller for an internal combustion engine of any one of Examples 1 to 5, the controller is configured to execute the dither control process on condition that an execution command signal of the filter regeneration process for repairing the filter is input from outside.

In the above-described configuration, the dither control process is executed on condition that the execution command signal of the regeneration process of the filter is input to repair the filter. Thus, based on the execution command signal, it is possible to determine whether to execute the dither control to control the target value to be leaner than the stoichiometric air-fuel ratio.

Example 7: In accordance with another aspect of the present disclosure, a method of controlling an internal combustion engine is provided. The internal combustion engine is mounted on a vehicle and including a filter configured to trap particulate matter in exhaust gas discharged from a plurality of cylinders and fuel injection valves provided for the respective cylinders. The method includes: executing, on condition that an execution request for a regeneration process of the filter is made, a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and executing a deposition amount calculating process of calculating a deposition amount, which is an amount of particulate matter trapped by the filter, such that, as compared to a case in which a target value of an average value of an exhaust air-fuel ratio in a predetermined period by the dither control process is a first air-fuel ratio, a decrease amount per unit time of the deposition amount is calculated to be a great value in a case in which the target value is a second air-fuel ratio, which is leaner than the first air-fuel ratio.

Example 8: In accordance with yet another aspect of the present disclosure, a controller for an internal combustion engine is provided. The controller is configured to control an internal combustion engine that is mounted on a vehicle and includes a filter configured to trap particulate matter in exhaust gas discharged from a plurality of cylinders and fuel injection valves provided for the respective cylinders. The controller includes processing circuitry. The processing circuitry is configured to execute: on condition that an execution request for a regeneration process of the filter is made, a dither control process of operating the fuel injection valves such that at least one of the cylinders is a lean combustion cylinder, in which an air-fuel ratio is leaner than a stoichiometric air-fuel ratio, and at least another one of the cylinders is a rich combustion cylinder, in which an air-fuel ratio is richer than the stoichiometric air-fuel ratio; and a deposition amount calculating process of calculating a deposition amount, which is an amount of particulate matter trapped by the filter, such that, as compared to a case in which a target value of an average value of an exhaust air-fuel ratio in a predetermined period by the dither control process is a first air-fuel ratio, a decrease amount per unit time of the deposition amount is calculated to be a great value in a case in which the target value is a second air-fuel ratio, which is leaner than the first air-fuel ratio.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A controller for an internal combustion engine according to an embodiment will now be described with reference to the drawings.

Figure 1:
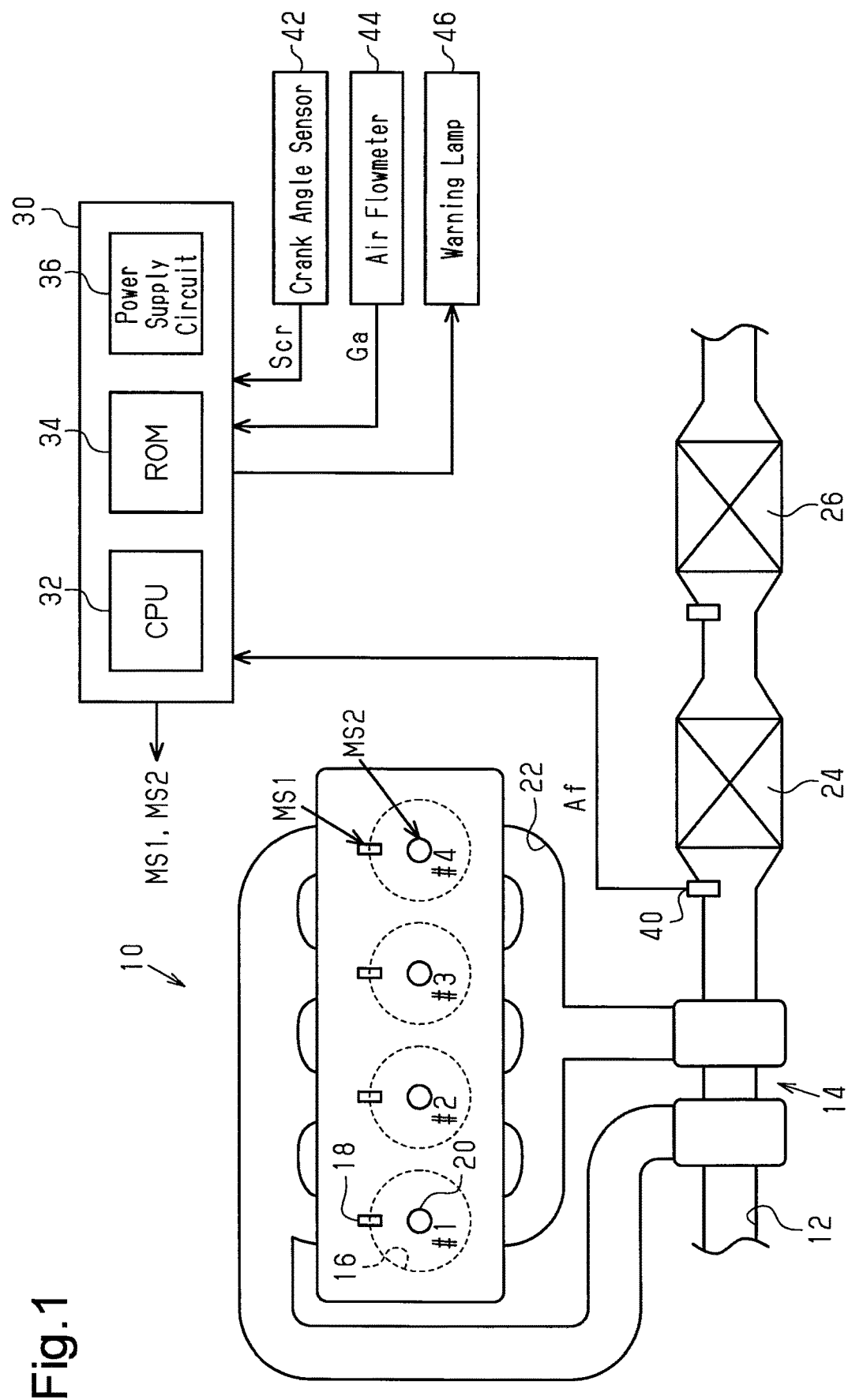
FIG. 1 is a schematic diagram of a controller according to an embodiment and an internal combustion engine.

In an internal combustion engine 10 shown in FIG. 1, the air drawn in from an intake passage 12 flows into combustion chambers 16 of respective cylinders #1 to #4 via a forced-induction device 14. Each of the cylinders #1 to #4 is provided with a fuel injection valve 18 configured to inject fuel and an ignition device 20 configured to generate spark discharge. In each combustion chamber 16, air-fuel mixture is subjected to combustion, and the air-fuel mixture subjected to combustion is exhausted to an exhaust passage 22 as exhaust gas. A three-way catalyst 24 having an oxygen storage capacity is provided in a section of the exhaust passage 22 that is downstream of the forced-induction device 14. Further, a gasoline particulate filter (GPF 26) is provided downstream of the three-way catalyst 24 in the exhaust passage 22.

A controller 30 controls the internal combustion engine 10 and controls the controlled portions of the engine 10 such as the fuel injection valves 18 and the ignition devices 20, thereby controlling the controlled amounts (the torque, exhaust components, and the like). At this time, the controller 30 refers to an air-fuel ratio Af detected by an air-fuel ratio sensor 40 on the upstream side of the three-way catalyst 24, an output signal Scr of a crank angle sensor 42, and an intake amount Ga detected by an air flowmeter 44. The controller 30 includes a CPU 32, a ROM 34, and a power supply circuit 36 that supplies power to each part in the controller 30, and executes control of the above-described controlled amounts by executing programs stored in the ROM 34 using the CPU 32.

Figure 2:
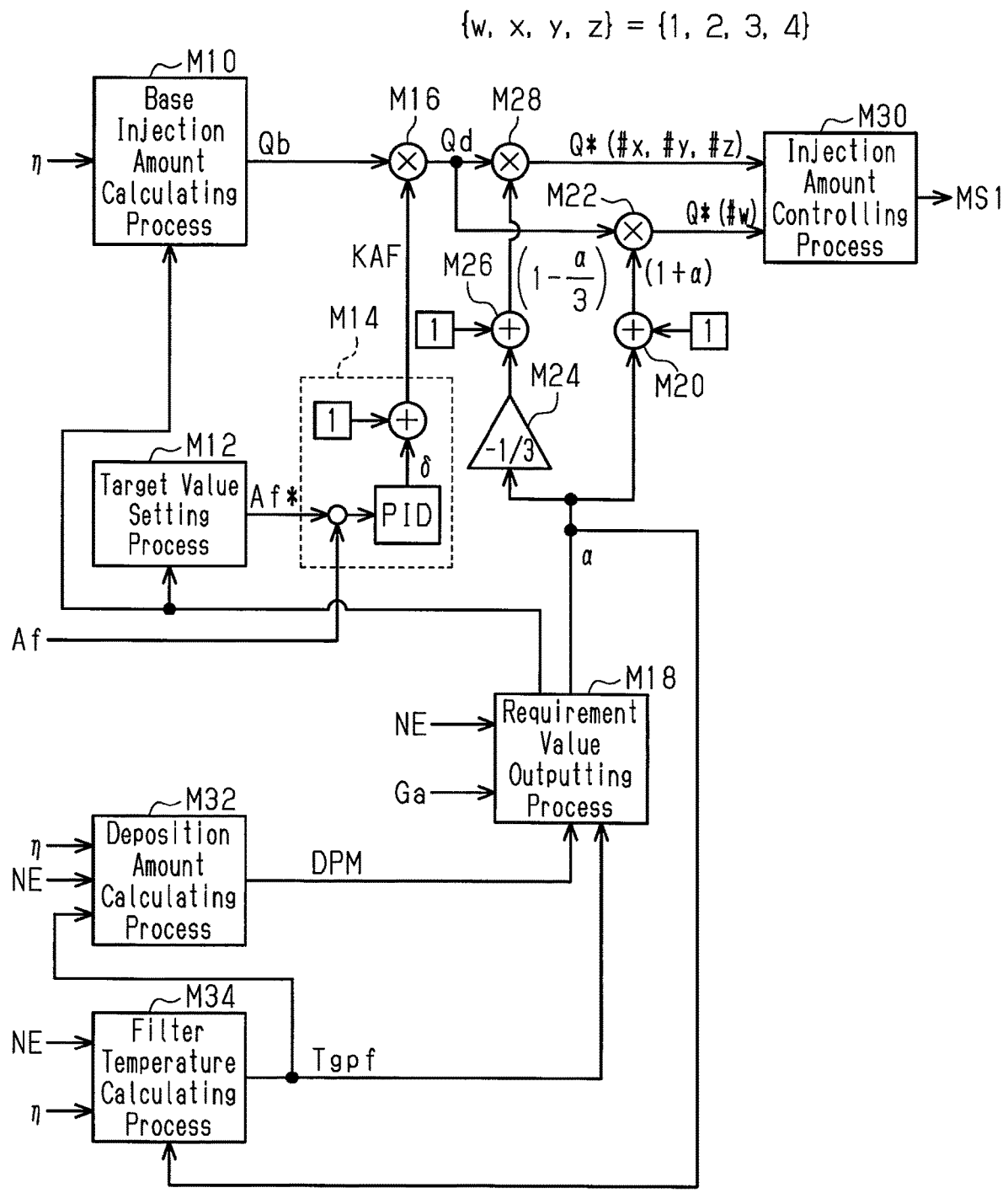
FIG. 2 is a block diagram showing processes executed by the controller of the embodiment.

FIG. 2 shows part of the processes that are implemented by the CPU 32 executing programs stored in the ROM 34.

A base injection amount calculating process M10 calculates a base injection amount Qb based on a charging efficiency $\eta$. The base injection amount Qb is an open-loop operation amount that is an operation amount for executing open-loop control to set the air-fuel ratio of the air-fuel mixture in the combustion chambers 16 to a target air-fuel ratio. The charging efficiency $\eta$ is a parameter that determines the amount of fresh air drawn into the combustion chambers 16. The charging efficiency $\eta$ is calculated by the CPU 32 based on the intake air amount Ga and the rotation speed NE of the crankshaft. The rotation speed NE is calculated by the CPU 32 based on the output signal Scr.

A target value setting process M12 sets a target value Af* of the feedback control amount that is used to cause the air-fuel ratio of the air-fuel mixture in the combustion chambers 16 to become the target air-fuel ratio.

A feedback process M14 calculates a feedback correction factor KAF, which is an operation amount used to execute feedback control to cause the air-fuel ratio Af, which is a feedback control amount, to become the target value Af*. In the present embodiment, the sum of the output values of a proportional element and a differential element that have, as the input, the difference between the target value Af* and the air-fuel ratio Af and the output value of an integral element that outputs an integrated value corresponding to the difference is used as a correction ratio δ of the base injection amount Qb, and the feedback correction factor KAF is set to (1+δ).

A required injection amount calculating process M16 corrects the base injection amount Qb by multiplying the base injection amount Qb by the feedback correction factor KAF, thereby calculating a required injection amount Qd.

A requirement value outputting process M18 calculates and outputs an injection amount correction requirement value α used in dither control, in which the air-fuel ratios of the air-fuel mixture to be burned are differentiated among the cylinders #1 to #4, while the components of the entire exhaust gas discharged from the respective cylinders #1 to #4 of the internal combustion engine 10 are made equivalent to that in the case in which the air-fuel ratios of the air-fuel mixture to be burned in all the cylinders #1 to #4 are set to the target air-fuel ratio. In the dither control according to the present embodiment, one of the first to fourth cylinders #1 to #4 is a rich combustion cylinder, in which the air-fuel ratio is made richer than the stoichiometric air-fuel ratio, and the remaining three cylinders are lean combustion cylinders, in which the air-fuel ratio is leaner than the stoichiometric air-fuel ratio. The injection amount in the rich combustion cylinder is calculated by multiplying the required injection amount Qd by a value (1+α). The injection amount in each lean combustion cylinder is calculated by multiplying the required injection amount Qd by a value (1−(α/3)). With the above-described setting of the injection amounts for the lean combustion cylinders and the rich combustion cylinder, if the amounts of air filling the cylinders #1 to #4 are the same, the components of the entire exhaust gas discharged from the respective cylinders #1 to #4 of the engine 10 can be made equivalent to those in a case in which the air-fuel ratios of the air-fuel mixture to be burned in all the cylinders #1 to #4 are equal to the target air-fuel ratio. With the above-described setting of the injection amounts, if the amounts of fresh air filling the cylinders #1 to #4 are the same, the reciprocal of the mean value of the fuel-air ratios of the air-fuel mixture to be burned in the cylinders #1 to #4 is the target air-fuel ratio. The fuel-air ratio is the reciprocal of the air-fuel ratio.

Setting the target air-fuel ratio to the reciprocal of the mean value of the fuel-air ratio aims at controlling the exhaust components as desired. Hereinafter, when the unburned fuel component in the exhaust gas and oxygen can react without excess or deficiency, the exhaust air-fuel ratio is referred to as stoichiometric air-fuel ratio. The greater the amount by which the unburned fuel component in the exhaust exceeds the amount that can react with oxygen without excess or deficiency, the richer the exhaust air-fuel ratio becomes. The smaller that amount, the leaner the exhaust air-fuel ratio becomes. However, the excess amount includes the case where the amount of the unburned fuel component in the exhaust gas is less than the amount that can react with oxygen without excess or deficiency, in which case the excess amount is a negative amount. Also, for example, the mean value of the exhaust air-fuel ratio per combustion cycle is defined as the exhaust air-fuel ratio for the entire exhaust gas discharged from the cylinders #1 to #4.

A correction factor calculating process M20 adds the injection amount correction requirement value α to 1 to calculate a correction factor for the required injection amount Qd with respect to the rich combustion cylinder. A dither correcting process M22 multiplies the required injection amount Qd by the correction factor (1+α) to calculate the injection amount command value Q* for the cylinder #w that is designated as a rich combustion cylinder. In this case, w refers to any of 1 to 4.

A multiplication process M24 multiplies the injection amount correction requirement value α by −⅓. A correction factor calculating process M26 adds the output value of the multiplication process M24 to 1 to calculate the correction factor for the required injection amount Qd with respect to each lean combustion cylinder. A dither correcting process M28 multiplies the required injection amount Qd by the correction factor (1−(α/3)) to calculate the injection amount command value Q* for the cylinders #x, #y, and #z, which are designated as the lean combustion cylinders. In this case, x, y, z are each any of 1 to 4, and w, x, y, z are all different.

An injection amount controlling process M30 generates an operation signal MS1 for the fuel injection valve 18 of the cylinder #w designated as the rich combustion cylinder based on the injection amount command value Q* output by the dither correcting process M22 and outputs the signal MS1 to the same fuel injection valve 18, thereby operating the fuel injection valve 18 such that the amount of fuel injected from the fuel injection valve 18 becomes the amount corresponding to the injection amount command value Q*. Also, the injection amount controlling process M30 generates an operation signal MS1 for the fuel injection valves 18 of the cylinders #x, #y, and #z designated as the lean combustion cylinders based on the injection amount command value Q* output by the dither correcting process M28 and outputs the signal MS1 to the same fuel injection valves 18, thereby operating the fuel injection valves 18 such that the amount of fuel injected from the fuel injection valves 18 becomes the amount corresponding to the injection amount command value Q*. Among the cylinders #1 to #4, the rich combustion cylinder is desirably changed at a cycle longer than one combustion cycle.

A deposition amount calculating process M32 calculates the amount of particulate matter trapped by the GPF 26, or a PM deposition amount DPM, based on the charging efficiency η, the rotation speed NE, a filter temperature Tgpf, which is the temperature of the GPF 26.

A filter temperature calculating process M34 is a process of calculating the filter temperature Tgpf based on the rotation speed NE, the charging efficiency η, and the injection amount correction requirement value α. More specifically, the filter temperature calculating process M34 calculates a base temperature Tb based on the rotation speed NE and the charging efficiency η and calculates the filter temperature Tgpf by increasing the base temperature Tb based on the injection amount correction requirement value α. The base temperature Tb is an estimated value of the temperature of the GPF 26 in a steady state, in which the fluctuation of the operating point of the internal combustion engine 10 determined by the rotation speed NE and the charging efficiency η is negligible when the dither control is not being executed. The heat of reaction in the three-way catalyst 24 of the unburned fuel discharged from the rich combustion cylinder and the oxygen discharged from the lean combustion cylinder causes the temperature of the exhaust gas downstream of the three-way catalyst 24 to be higher in the case of executing the dither control than in the case of not executing the dither control. The amount of temperature increase of the exhaust gas downstream of the three-way catalyst 24 due to the dither control is greater when the injection amount correction requirement value α is great than it is small. For this reason, the filter temperature Tgpf is calculated by increasing the base temperature Tb in accordance with the injection amount correction requirement value α. Specifically, the base temperature Tb is calculated through map calculation by the CPU 32 with map data having the rotation speed NE and the charging efficiency η as input variables and the base temperature Tb as an output variable stored in the ROM 34 in advance. Further, with map data having the injection amount correction requirement value α as an input variable and the amount of temperature increase as an output variable stored in the ROM 34 in advance, the amount of temperature increase is calculated through map calculation by the CPU 32. Then, the filter temperature Tgpf is calculated by approximating, as time elapses, the filter temperature Tgpf to the amount obtained by adding the amount of temperature increase to the base temperature Tb. Specifically, the CPU 32 calculates the filter temperature Tgpf by performing exponential moving averaging process of the filter temperature Tgpf and the value obtained by adding the amount of temperature increase to the base temperature Tb.

The map data refers to a data set of discrete values of the input variable and values of the output variable each corresponding to a value of the input variable. When the value of an input variable matches any of the values of the input variable on the map data, the map calculation uses the value of the corresponding output variable on the map data as the calculation result. When the value of the input variable does not match any of the values of the input variable on the map data, the map calculation uses a value obtained by interpolation of multiple values of the output variable included in the map data set as the calculation result.

The requirement value outputting process M18 sets the injection amount correction requirement value α to a value greater than 0 to execute a filter regeneration process in accordance with the PM deposition amount DPM.

Figure 3:
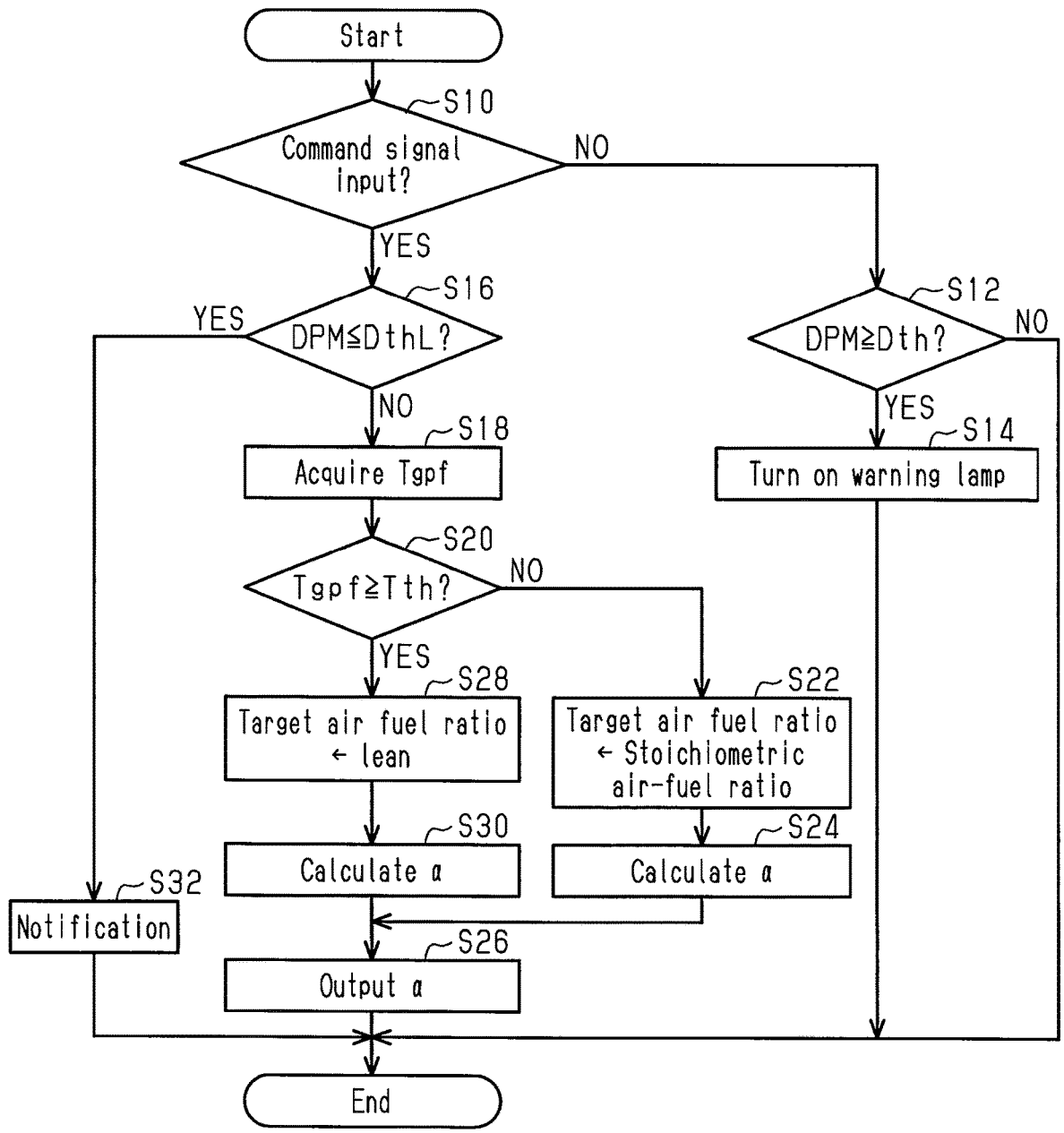
FIG. 3 is a flowchart showing the procedure of a process of calculating a requirement value output process of the embodiment.

FIG. 3 shows the procedure of the requirement value outputting process M18. The processes shown in FIG. 3 are executed by the CPU 32 repeatedly executing programs stored in the ROM 34 at a predetermined interval. In the following description, the number of each step is represented by the letter S followed by a numeral.

In the series of processes shown in FIG. 3, the CPU 32 determines whether an execution command signal of the filter regeneration process for repair has been input to the controller 30 from the outside (S10). The command signal is assumed to be a signal input from a dedicated troubleshooting device (maintenance device) by a repair shop worker with the maintenance device connected to the controller 30. That is, the process of S10 is a process of determining whether it is time for the user to take the vehicle to repair shop and have a filter regeneration process executed on the vehicle by a repair shop worker.

When determining that no command signal has been input (S10: NO), the CPU 32 determines whether the PM deposition amount DPM is greater than or equal to a prescribed amount Dth (S12). The prescribed amount Dth is set to a value at which the PM deposition amount DPM is considerably large, and if the PM is left untreated, there is a possibility of hindering the operation of the internal combustion engine 10. The process of S12 is a process of determining whether there is an execution request for the regeneration process. When determining that the PM deposition amount DPM is greater than or equal to the prescribed amount Dth (S12: YES), the CPU 32 determines that there is an execution request. In this case, the CPU 32 operates a warning lamp 46 shown in FIG. 1 to execute a process of urging the user of the vehicle equipped with the internal combustion engine 10 to have a filter regeneration process executed at a repair shop due to a large value of the PM deposition amount DPM (S14).

When determining that a command signal has been input (S10: YES), the CPU 32 determines whether the PM deposition amount DPM is smaller than or equal to a predetermined amount DthL, which is smaller than the prescribed amount Dth (S16). When determining that the PM deposition amount DPM is greater than the predetermined amount DthL (S16: NO), the CPU 32 acquires the filter temperature Tgpf (S18). Then, the CPU 32 determines whether the filter temperature Tgpf is higher than or equal to a predetermined temperature Tth (S20). The predetermined temperature Tth is set to a temperature at which the particulate matter trapped by the GPF 26 can be burned by supplying oxygen to the GPF 26 (for example, 550° or higher).

When determining that the filter temperature Tgpf is lower than the predetermined temperature Tth (S20: NO), the CPU 32 sets the target air-fuel ratio to the stoichiometric air-fuel ratio (S22). This is a setting for controlling the mean value of the exhaust air-fuel ratios of cylinders #1 to #4 to the stoichiometric air-fuel ratio. Then, the CPU 32 calculates the injection amount correction requirement value α based on the rotation speed NE and the charging efficiency η (S24), and outputs the injection amount correction requirement value α (S26). In contrast, when determining that the filter temperature Tgpf is higher than or equal to the predetermined temperature Tth (S20: YES), the CPU 32 sets the target air-fuel ratio to a value leaner than the stoichiometric air-fuel ratio (S28). This is a setting for controlling the mean value of the exhaust air-fuel ratios of the cylinders #1 to #4 to be leaner than the stoichiometric air-fuel ratio and supplying oxygen to the GPF 26. Then, the CPU 32 calculates the injection amount correction requirement value α based on the rotation speed NE and the charging efficiency η (S30), and outputs the injection amount correction requirement value α (S26).

In contrast, when determining that the PM deposition amount DPM is smaller than or equal to the predetermined amount DthL (S16: YES), the CPU 32 executes a notification process of outputting a signal indicating that the filter regeneration process is completed to the maintenance device (S32).

When the processes of S14, S26, S32 are completed or when the determination is negative in the process of S12, the CPU 32 temporarily ends the series of processes shown in FIG. 3.

In the processes of S24 and S30, the CPU 32 calculates the injection amount correction requirement value α by using map data that is stored in the ROM 34 in advance and has the rotation speed NE and the charging efficiency η as input variables and the injection amount correction requirement value α as an output variable. The output variable of the map data used in the process of S24 is greater than or equal to the output variable of the map data used in the process of S30. Specifically, at a particular operating point, the output variables of the two sets of map data are equal to each other and their values are zero. This corresponds to operating points that are not appropriate for the filter regeneration process. That is, there are operating points at which it is difficult to raise the temperature of the GPF 26 to an appropriate temperature for the filter regeneration process. At these operating points, the dither control is not executed, so that the output variable is zero. In contrast, when the output variable of the map data used in the process of S24 is not zero, it is greater than the output variable of the map data used in the process of S30. This is because, since the process of S30 is configured to determine the injection amount correction requirement value α when the target air-fuel ratio is leaner than the stoichiometric air-fuel ratio, the injection amount correction requirement value α cannot be made a significantly great value in order to prevent the air-fuel ratio of the lean combustion cylinder from reaching the lean-side misfire limit, which is the lower limit value causing misfire.

Figure 4:
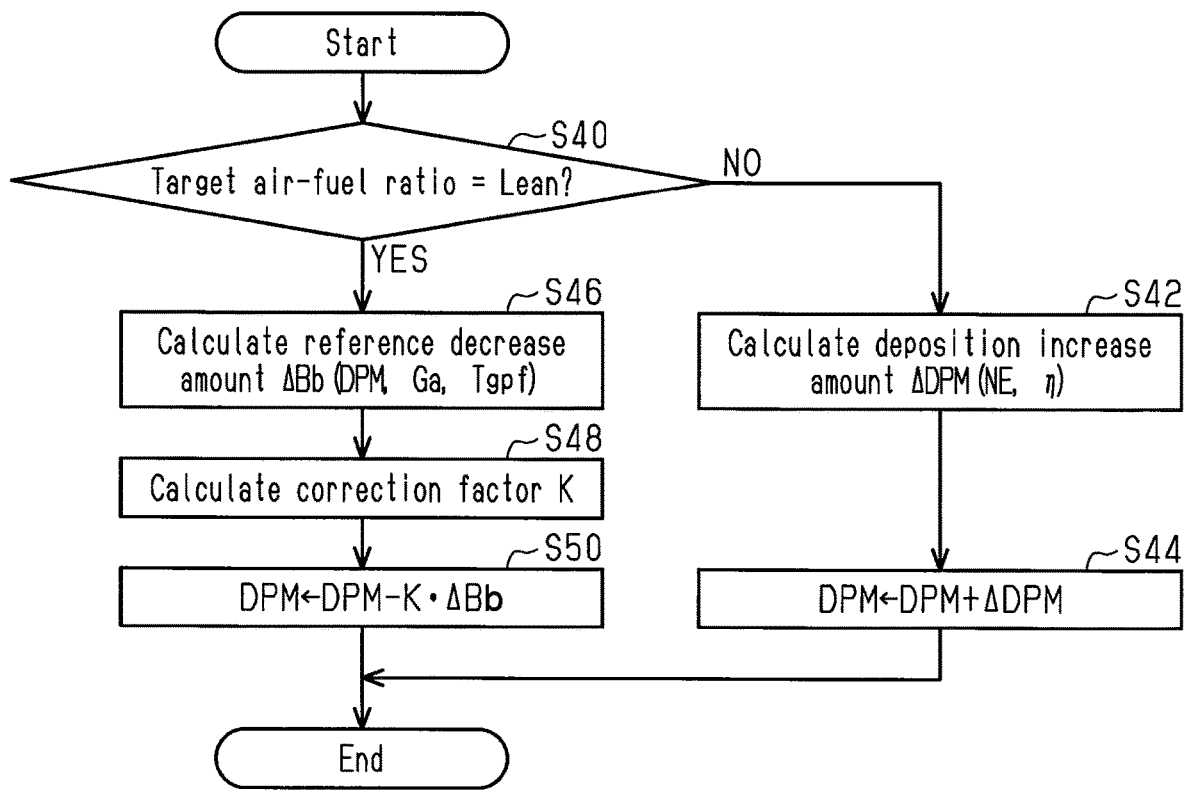
FIG. 4 is a flowchart showing the procedure of a deposition amount calculating process of the embodiment.

FIG. 4 shows the procedure of the deposition amount calculating process M32. The processes shown in FIG. 4 are executed by the CPU 32 repeatedly executing programs stored in the ROM 34 at a predetermined interval.

In the series of processes shown in FIG. 4, the CPU 32 first determines whether the target air-fuel ratio is lean (S40). This process is configured to determine whether the process of S28 is being executed. When determining that the target air-fuel ratio is not lean (S 40: NO), the CPU 32 determines that the target air-fuel ratio is the stoichiometric air-fuel ratio. On the assumption that the target air-fuel ratio is the stoichiometric air-fuel ratio, the CPU 32 calculates a deposition increase amount ΔDPM, which is an increase amount per unit time of PM deposition amount DPM (S42). Specifically, the CPU 32 calculates the deposition increase amount ΔDPM based on rotation speed NE and the charging efficiency η. This is accomplished, for example, by calculating the deposition increase amount ΔDPM by the CPU 32 in a state in which map data having the rotation speed NE and the charging efficiency η as input variables and the deposition increase amount ΔDPM as an output variable is stored in advance in the ROM 34. Next, the CPU 32 updates the PM deposition amount DPM by adding the deposition increase amount ΔDPM to the PM deposition amount DPM that was calculated in the previous control cycle of the series of processes shown in FIG. 4 (S44).

In contrast, when determining that the target air-fuel ratio is lean (S40: YES), the CPU 32 calculates a reference decrease amount ΔBb, which is a decrease amount per unit time of the PM deposition amount DPM (S46). The reference decrease amount ΔBb is a value greater than or equal to zero, and the greater the value of the reference decrease amount ΔBb, the more rapidly the PM deposition amount DPM decreases. Specifically, the CPU 32 calculates the reference decrease amount ΔBb based on the PM deposition amount DPM, the intake air amount Ga, and the filter temperature Tgpf (S46). The CPU 32 calculates the reference decrease amount ΔBb to be a greater value when the PM deposition amount DPM is great than when the PM deposition amount DPM is small. Also, the CPU 32 calculates the reference decrease amount ΔBb to be a greater value when the intake air amount Ga is great than when the intake air amount Ga is small. This setting is employed in view of the fact that, if the air-fuel ratio is the same, the amount of oxygen flowing into the GPF 26 and the amount of particulate matter oxidized are greater when the intake air amount Ga is great than when the intake air amount Ga is small.

Figure 5:
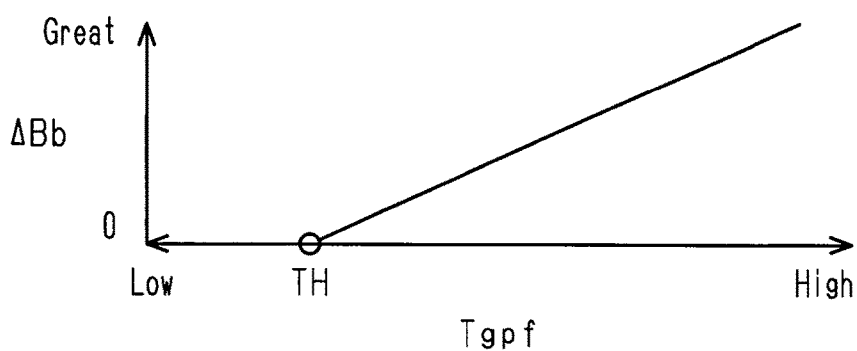
FIG. 5 is a graph showing the relationship between the filter temperature and the reference decrease amount of the embodiment.

If the filter temperature Tgpf is higher than or equal to a prescribed temperature TH as shown in FIG. 5, the CPU 32 calculates the reference decrease amount ΔBb to be a greater value when the filter temperature Tgpf is high than when the filter temperature Tgpf is low. When the filter temperature Tgpf is lower than the prescribed temperature TH, the CPU 32 sets the reference decrease amount ΔBb to zero. The prescribed temperature TH is set to a value lower than the predetermined temperature Tth.

Specifically, it only requires to calculate the reference decrease amount ΔBp through map calculation by the CPU 32 with map data having the PM deposition amount DPM, the intake air amount Ga, and the filter temperature Tgpf as input variables and the reference decrease amount ΔBb as an output variable stored in the ROM 34 in advance.

Referring back to FIG. 4, the CPU 32 calculates a correction factor K that corrects the reference decrease amount ΔBb based on the air-fuel ratio (S48).

Figure 6:
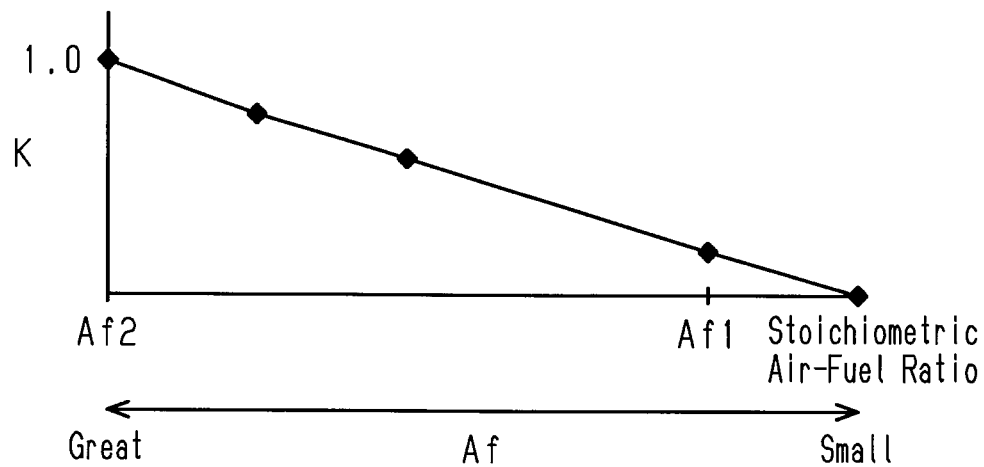
FIG. 6 is a graph showing the setting of a correction factor of the embodiment.

FIG. 6 shows the relationship between the correction factor K and the air-fuel ratio AF. As shown in FIG. 6, the greater the air-fuel ratio AF, in other words, the leaner the air-fuel mixture, the greater the correction factor K becomes. The correction factor K is 0 when the air-fuel ratio Af is the stoichiometric air-fuel ratio. An air-fuel ratio Af2, at which the correction factor K is 1, is the air-fuel ratio assumed at the reference decrease amount ΔBb. The correction factor K at an air-fuel ratio Af1, which is richer than the air-fuel ratio Af2 in FIG. 6 and is leaner than the stoichiometric air-fuel ratio, is smaller than 1 and greater than zero.

Referring back to FIG. 4, the CPU 32 subtracts the value obtained by multiplying the reference decrease amount ΔBb by the correction factor K from the PM deposition amount DPM that was calculated in the previous control cycle of the series of processes shown in FIG. 4, thereby updating the PM deposition amount DPM (S50). As a result, the leaner the air-fuel ratio, the greater the value of the correction factor K becomes. Accordingly, the decrease amount of the PM deposition amount DPM increases.

Figure 7:
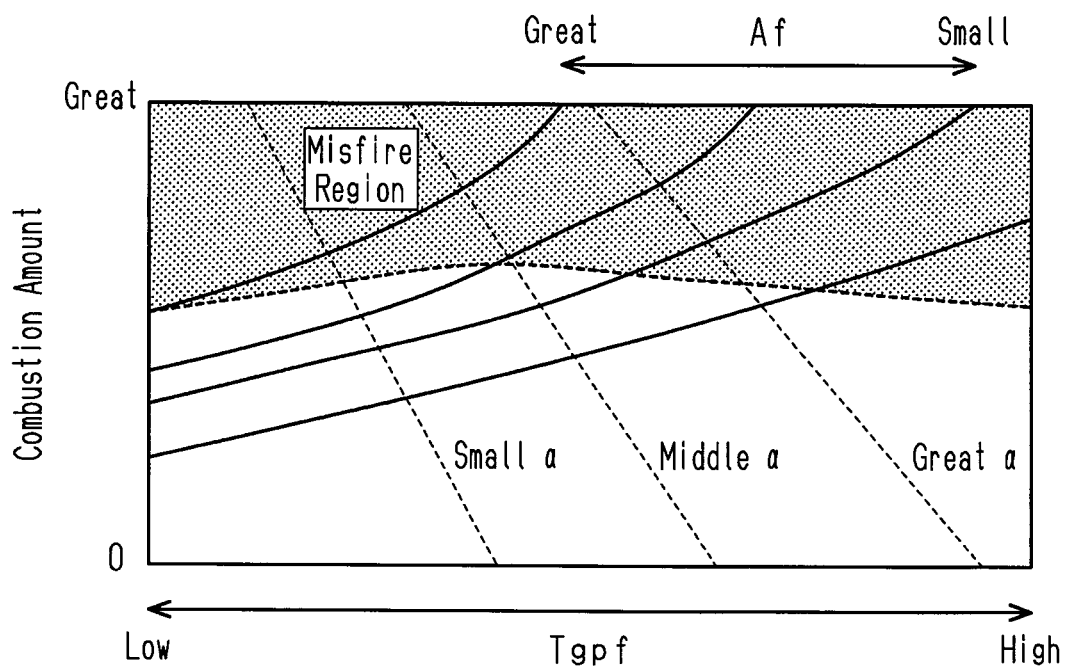
FIG. 7 is a graph showing the relationship between the filter temperature and the combustion amount of the embodiment.

FIG. 7 shows the relationship of the combustion amount of particulate matter per unit time in the GPF 26 with the air-fuel ratio and filter temperature Tgpf in a region leaner than the stoichiometric air-fuel ratio. Four rising curves in FIG. 7 represent different air-fuel ratios. As shown in FIG. 7, when the filter temperature Tgpf is the same, the leaner the air-fuel ratio, the greater the combustion amount per unit time becomes. This is considered to correspond to the fact that the leaner the air-fuel ratio, the greater becomes the amount of oxygen that flows into the GPF 26 and oxidizes the particulate matter. In the process of S50 shown in FIG. 4, the PM deposition amount DPM is updated by correcting the reference decrease amount ΔBb with the correction factor K, the fact that the combustion amount per unit time changes in accordance with the air-fuel ratio is properly reflected on the control.

When the processes of steps S44, S50 are completed, the CPU 32 temporarily ends the series of processes shown in FIG. 4.

The operation and advantages of the present embodiment will now be described.

When determining that the PM deposition amount DPM is greater than or equal to the prescribed amount Dth, the CPU 32 turns on the warning lamp 46 to urge the user to order repair service. As a result, when a maintenance device is connected to the controller 30 at the dealer and an execution command signal for the regeneration process is input, the CPU 32 initially executes the dither control process with the target air-fuel ratio set to the stoichiometric air-fuel ratio, thereby increasing the temperature of the GPF 26. At this time, the CPU 32 increases and updates the value of the PM deposition amount DPM based on the operating point of the internal combustion engine 10. When determining that the filter temperature Tgpf will be higher than or equal to the predetermined temperature Tth, the CPU 32 burns and removes the particulate matter trapped by the GPF 26 by making the target air-fuel ratio lean. At this time, the CPU 32 successively calculates the decrease amount of the PM deposition amount DPM based on the intake air amount Ga and the air-fuel ratio, and updates the PM deposition amount DPM. As a result, the CPU 32 can capture the timing at which the PM deposition amount DPM becomes smaller than or equal to the predetermined amount DthL with high accuracy, and eventually set the regeneration process time to a value without excess or deficiency as much as possible.

<Correspondence>

The correspondence between the items in the above embodiments and the items described in the above SUMMARY is as follows. Below, the correspondence is shown for each of the numbers in the examples described in the above SUMMARY.

Regarding Example 1: The filter corresponds to the GPF 26. The dither control process corresponds to the correction factor calculating process M20, the dither correcting process M22, the multiplication process M24, the correction factor calculating process M26, the dither correcting processing M28, and the injection amount controlling process M30 in a case in which a negative determination is made in the process of S16 and the injection amount correction requirement value α is greater than zero. The target value corresponds to the target air-fuel ratio, and the predetermined period corresponds to one combustion cycle.

Regarding Example 2: Example 2 corresponds to the process of S56 being executed separately from the process of S48, which is the correction process with the injection amount correction requirement value α in the process of FIG. 4.

Regarding Example 4: The first mode corresponds to the processes of S22 and S24, and the second mode corresponds to the processes of S28 and S30.

<Other Embodiments>

The present embodiment may be modified as follows. The above-described embodiment and the following modifications can be combined as long as the combined modifications remain technically consistent with each other.

Regarding Deposition Amount Calculating Process

In the above-described embodiment, the reference decrease amount ΔBb, which is calculated based on the PM deposition amount DPM, the intake air amount Ga, and the filter temperature Tgpf, is corrected with the correction factor K, which corresponds to the air-fuel ratio. However, the configuration is not limited to this. For example, the decrease amount ΔB may be calculated through map calculation by the CPU 32 with map data having the PM deposition amount DPM, the intake air amount Ga, the filter temperature Tgpf, and the air-fuel ratio as input variables and the decrease amount ΔB as an output variable stored in the ROM 34 in advance. Also, the rotation speed NE and charging efficiency η may be used in place of the intake air amount Ga, for example. Also, for example, the decrease amount ΔB may be calculated by using map data having the PM deposition amount DPM, the intake air amount Ga, and the air-fuel ratio as input variables, and the reference decrease amount ΔBb as an output variable, and map data having the filter temperature Tgpf as an input variable and the correction factor K as an output variable.

In the above-described embodiment, when the target air-fuel ratio is lean, only the subtraction process of the PM deposition amount DPM based on the decrease amount ΔB is performed, but the configuration is not limited to this. For example, the deposition increase amount ΔDPM may be calculated all the time irrespective of whether or not the target air-fuel ratio is lean. Also, the process of S40 may be deleted, and the update amount of the PM deposition amount DPM may always be set to the decrease amount ΔB and the deposition increase amount ΔDPM. Even in that case, if the correction factor K in the case of the stoichiometric air-fuel ratio is zero, for example, the decrease amount ΔB is zero if the target air-fuel ratio is stoichiometric air-fuel ratio. Thus, the process equivalent to the process of S44 can be implemented.

Regarding First Mode and Second Mode

In the above-described embodiment, the output variable of the map data for the first mode (for the process of S24) at the operating point at which the dither control is executed is always greater than the output variable of the map data for the second mode (for the process of S30). However, the setting is not limited to this. For example, at some operating points, the values of the output variables may be equal.

In the above-described embodiment, when the filter temperature Tgpf is lower than the predetermined temperature Tth, the target air-fuel ratio is set to the stoichiometric air-fuel ratio, which is the mean value of the exhaust air-fuel ratios of the cylinders #1 to #4. However, the configuration is not limited to this. For example, the target air-fuel ratio may be leaner than the stoichiometric air-fuel ratio while being richer than when the filter temperature Tgpf is higher than or equal to the predetermined temperature Tth. If this value is set to the air-fuel ratio Af1 in FIG. 6, for example, the decrease amount ΔB becomes greater than zero when the filter temperature Tgpf is higher than or equal to the predetermined temperature TH.

In the above-described embodiment, the processes of S22 and S24 are switched to the processes S28 and S30 when the filter temperature Tgpf becomes higher than or equal to the predetermined temperature Tth. However, the configuration is not limited to this. For example, the processes of S22 and S24 may be switched to the processes of S28 and S30 when the execution time of the dither control is a predetermined time.

Regarding Execution Command Signal for Repair

In the above-described embodiment, a maintenance device is connected to the controller 30, and the execution command signal is delivered from the maintenance device to the controller 30. However, the configuration is not limited to this. For example, a predetermined operation state that cannot be anticipated from normal operations by the user, for example, simultaneous depression of the accelerator pedal and the brake pedal while the shift lever is in the neutral position, may be regarded as the input of the execution command signal for the regeneration process.

Regarding Filter Temperature

In the above-described embodiment, the estimated filter temperature Tgpf is used to calculate the PM deposition amount DPM. However, the configuration is not limited to this. For example, a temperature sensor such as a thermocouple may be provided in the GPF 26, and a detected value may be used.

Regarding Dither Control Process Executed on Condition that Filter Regeneration Request is Made In the above-described embodiment, the filter regeneration process is executed on the condition that the execution command signal by a worker at the repair shop is received.

However, the configuration is not limited to this. For example, when the PM deposition amount DPM is smaller than or equal to a predetermined amount smaller than the prescribed amount Dth and the internal combustion engine 10 is operated under a high load, the filter regeneration process may be executed by setting the injection amount correction requirement value α to a value smaller than that in the above-described embodiment and executing the dither control process. Even in this case, the controller 30 simply needs to have the first mode and the second mode and set the target air-fuel ratio of the second mode to be leaner than the target air-fuel ratio of the first mode.

Regarding Dither Control Process

In the above-described embodiment, the injection amount correction requirement value α is calculated from two parameters, or the rotation speed NE and the charging efficiency η. However, the configuration is not limited to this. For example, the injection amount correction requirement value α may be calculated based on the temperature of coolant of the internal combustion engine 10 (coolant temperature THW) in addition to the rotation speed NE and the charging efficiency η. Further, the PM deposition amount DPM may be taken into consideration. Further, the rotation speed NE and the charging efficiency η do not necessarily need to be taken into consideration. For example, the injection amount correction requirement value α may be variably set based only on at least one parameter among the four parameters, or the PM deposition amount DPM, the coolant temperature THW, the rotation speed NE, and the charging efficiency η. In the above-described embodiment, the rotation speed NE and the charging efficiency η are used as parameters for determining the operating point of the internal combustion engine 10. Instead of the charging efficiency η, which is a load, the accelerator operation amount may be used as a load. Alternatively, the injection amount correction requirement value α may be variably set in accordance with the intake air amount Ga instead of the rotation speed NE.

It is not essential to variably set the injection amount correction requirement value α to a value greater than 0 at the operating point at which the dither control is executed. For example, a single value greater than zero for the process of S24 at the operating point at which the dither control is executed and a single value greater than zero for the process of S30 may be determined.

In the above-described embodiment, the number of the lean combustion cylinders is greater than the number of the rich combustion cylinders, but the configuration is not limited to this. For example, the number of the rich combustion cylinders and the number of the lean combustion cylinders may be equal to each other. Alternatively, instead of setting all the cylinders #1 to #4 to either a lean combustion cylinder or a rich combustion cylinder, the air-fuel ratio of one cylinder may be set to the target air-fuel ratio. Furthermore, if the cylinder filling air amount remains constant in one combustion cycle, the reciprocal of the mean value of the fuel-air ratios does not need to be the target air-fuel ratio. For example, in the case of four cylinders as in the above-described embodiment, if the cylinder filling air amount remains constant, the reciprocal of the mean value of the fuel-air ratios at five strokes may be used as the target air-fuel ratio. Also, the reciprocal of the mean value of the fuel-air ratios at three strokes may be used as the target air-fuel ratio. However, it is desirable that a period in which both a rich combustion cylinder and a lean combustion cylinder exist in a single combustion cycle occurs at least once every two combustion cycles. In other words, if the cylinder filling air amount remains constant, it is desirable to set the predetermined period to two or fewer combustion cycles when setting target air-fuel ratio to the reciprocal of the mean value of the fuel-air ratios. For example, if the predetermined period is set to two combustion cycles and the rich combustion cylinder exists only once during two combustion cycles, the appearance order of the rich combustion cylinder and the lean combustion cylinder is represented by R, L, L, L, L, L, L, L, where the lean combustion cylinder is represented by R, and the lean combustion cylinder is represented by L. In this case, a period of one combustion cycle that is shorter than the predetermined period and represented by R, L, L, L is provided, and part of cylinders #1 to #4 is a lean combustion cylinder and the other cylinders are rich combustion cylinders. When the reciprocal of the mean value of the fuel-air ratios of periods different from one combustion cycle is used as the target air-fuel ratio, it is desirable that the amount of air that is drawn into the internal combustion engine in the intake stroke and is blown back to the intake passage before the intake valve closes be negligible.

Regarding Exhaust Purification Device

In the above-described embodiment, the three-way catalyst 24 is used as an upstream-side exhaust purification device, and the GPF 26 is used as a downstream-side exhaust purification device. However, the configuration is not limited to this. For example, the upstream-side exhaust purification device may be the GPF 26, and the downstream-side exhaust purification device may be the three-way catalyst 24. In the above-described configuration, the three-way catalyst 24 and the GPF 26 are presented as the exhaust gas purification devices, but the configuration is not limited to this. For example, only the GPF 26 may be employed. However, in a case in which a catalyst having an oxygen storage capacity is not provided on the upstream side of the GPF 26, the GPF 26 preferably supports a catalyst having an oxygen storage capacity in order to improve the temperature increasing performance of the dither control. However, this is not the case if unburned fuel and oxygen can be reacted in a section of the exhaust passage 22 upstream of the GPF 26, for example. Further, in the case where unburned fuel and oxygen can be reacted in the exhaust passage 22, even if a catalyst having oxygen storage capacity is not provided on the upstream side of the GPF 26, the combustion amount of PM may be set to zero if the process of S22 is being executed. However, even when a catalyst having an oxygen storage capacity is not provided on the upstream side of the GPF 26 and the GPF 26 supports a catalyst having an oxygen storage capacity, the combustion amount of PM may be regarded as zero during the process of S22 if the amount of reaction between unburned fuel and oxygen in the GPF 26 is negligibly small as compared with the amount of reaction between PM and oxygen in the GPF 26 is negligibly small.

Regarding Controller

The controller is not limited to a device that includes the CPU 32 and the ROM 34 and executes software processing. For example, at least part of the processes executed by the software in the above-illustrated embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Regarding Internal Combustion Engine

The internal combustion engine is not limited to a four-cylinder engine. For example, an in-line six-cylinder engine may be used. Alternatively, a V engine may be used, which includes a first exhaust purification device and a second exhaust purification device that purify exhaust gas from different cylinders.

Other Modifications

The fuel injection valve is not limited to one that injects fuel into the combustion chamber 16, but may be one that injects fuel, for example, into the intake passage 12. The air-fuel ratio feedback control does not necessarily need to be executed when the dither control is executed.

Therefore, the present examples and embodiments are to be considered as illustrative and not restrictive and the disclosure is not to be limited to the examples and embodiments given herein.

The invention claimed is:

1. A controller for an internal combustion engine, the controller being configured to control an internal combustion engine that is mounted on a vehicle and includes a filter configured to trap particulate matter in exhaust gas discharged from a plurality of cylinders and fuel injection valves provided for the respective cylinders, the controller comprising a processor being configured to execute:
   when an execution request for a regeneration process of the filter is made, a dither control process of operating the fuel injection valves such that:
      at least one of the cylinders is a lean combustion cylinder in which an air-fuel ratio is leaner than a stoichiometric air-fuel ratio, and
      at least another one of the cylinders is a rich combustion cylinder in which an air-fuel ratio is richer than the stoichiometric air-fuel ratio; and
   a deposition amount calculating process of calculating a deposition amount, which is an amount of particulate matter trapped by the filter, such that,
      as compared to a case in which a target value of an average value of an exhaust air-fuel ratio in a predetermined period by the dither control process is a first air-fuel ratio, a decrease amount per unit time of the deposition amount is calculated to be a greater value in a case in which the target value is a second air-fuel ratio, which is leaner than the first air-fuel ratio.

2. The controller for an internal combustion engine according to claim 1, wherein the controller is configured to execute a second mode, in which the controller executes the dither control process with the target value set to the second air-fuel ratio, after a first mode, in which the controller executes the dither control process with the target value set to the first air-fuel ratio.

3. The controller for an internal combustion engine according to claim 2, wherein
   the first air-fuel ratio is the stoichiometric air-fuel ratio, and
   the deposition amount calculating process includes a process in which a temperature of the filter is used as an input, and
   when the temperature is higher than or equal to a prescribed temperature, the decrease amount is calculated to be a value greater than zero in a case in which the target value is the second air-fuel ratio, and to be zero in a case in which the target value is the first air-fuel ratio.

4. The controller for an internal combustion engine according to claim 3, wherein a catalyst having an oxygen storage capacity is provided in a section of an exhaust passage of the internal combustion engine that is upstream of the filter.

5. The controller for an internal combustion engine according to claim 1, wherein the first air-fuel ratio is leaner than the stoichiometric air-fuel ratio.

6. The controller for an internal combustion engine according to claim 1, wherein the controller is configured to execute the dither control process on condition that an execution command signal of the filter regeneration process for repairing the filter is input from outside.

7. A method of controlling an internal combustion engine, the internal combustion engine being mounted on a vehicle and including a filter configured to trap particulate matter in exhaust gas discharged from a plurality of cylinders and fuel injection valves provided for the respective cylinders, the method comprising:
   executing, when an execution request for a regeneration process of the filter is made, a dither control process of operating the fuel injection valves such that:
      at least one of the cylinders is a lean combustion cylinder in which an air-fuel ratio is leaner than a stoichiometric air-fuel ratio, and
      at least another one of the cylinders is a rich combustion cylinder in which an air-fuel ratio is richer than the stoichiometric air-fuel ratio; and
   executing a deposition amount calculating process of calculating a deposition amount, which is an amount of particulate matter trapped by the filter, such that,
      as compared to a case in which a target value of an average value of an exhaust air-fuel ratio in a predetermined period by the dither control process is a first air-fuel ratio, a decrease amount per unit time of the deposition amount is calculated to be a greater value in a case in which the target value is a second air-fuel ratio, which is leaner than the first air-fuel ratio.

8. A controller for an internal combustion engine, the controller being configured to control an internal combustion engine that is mounted on a vehicle and includes a filter configured to trap particulate matter in exhaust gas discharged from a plurality of cylinders and fuel injection valves provided for the respective cylinders, wherein
   the controller comprises processing circuitry, and
   the processing circuitry is configured to execute:
      when an execution request for a regeneration process of the filter is made, a dither control process of operating the fuel injection valves such that:
         at least one of the cylinders is a lean combustion cylinder in which an air-fuel ratio is leaner than a stoichiometric air-fuel ratio, and
         at least another one of the cylinders is a rich combustion cylinder in which an air-fuel ratio is richer than the stoichiometric air-fuel ratio; and a deposition amount calculating process of calculating a deposition amount, which is an amount of particulate matter trapped by the filter, such that,
as compared to a case in which a target value of an average value of an exhaust air-fuel ratio in a predetermined period by the dither control process is a first air-fuel ratio, a decrease amount per unit time of the deposition amount is calculated to be a greater value in a case in which the target value is a second air-fuel ratio, which is leaner than the first air-fuel ratio.

\* \* \* \* \*